Patented Mar. 17, 1942

2,276,597

UNITED STATES PATENT OFFICE 2,276,597

MANUFACTURE OF GLYCOL ETHERS

Herbert Muggleton Stanley, Tadworth, and Philip Eaglesfield, Carshalton, England, assignors to The Distillers Company Limited, Edinburgh, Scotland, a British company No Drawing. Application June 25, 1940, Serial No. 342,392. In Great Britain July 1, 1939

7 Claims. (Cl. 260—615)

The present invention relates to the manufacture of glycol derivatives, particularly glycol ethers. It has been proposed to use tertiary amines as catalysts for promoting the reaction between alkylene oxides such as ethylene oxide with hydroxy compounds and particularly tertiary aliphatic amines such as tributylamine and heterocyclic bases such as pyridine have been referred to.

The use of such tertiary amines however presents very serious disadvantages as their catalytic activity becomes rapidly reduced, relatively large amounts of catalyst are required to obtain satisfactory conversions and yields, and the products obtained are contaminated with undesirable by-products that cannot be easily removed. We have now found the above disadvantages can be avoided and that satisfactory conversions and yields can be obtained by utilising as catalyst very small amounts of hexamethylene tetramine.

According to the present invention therefore glycol derivatives are obtained by the interaction of an alkylene oxide with an organic compound containing a hydroxyl group or groups in presence of small amounts of hexamethylene tetramine.

Preferably the reaction is carried out by heating an alkylene oxide with the hydroxy compound with which it is desired to cause it to interact at moderately elevated temperatures, e. g. temperatures of about 50–200° C. under sufficient pressure to maintain substantially liquid-phase conditions during the reaction. The reaction may be carried out batchwise, e. g. in an autoclave, or may be effected continuously, e. g. by mixing streams of the alkylene oxide with an appropriate alcohol containing a small amount of hexamethylene tetramine and heating the mixture to the reaction temperature, e. g. about 100° C., maintaining it at that temperature under sufficient pressure to maintain the reactants in the liquid phase for a period sufficient to effect the conversion of the major portion of the alkylene oxide present and thereafter continuously fractionating the product.

The amount of hexamethylene tetramine needed to effect the reaction is very small and amounts as low as 0.01% have been found to be effective. Generally speaking, however, an amount of about 0.1% is suitable, although, of course, larger amounts can be used if desired. When using the tertiary amines which have been hitherto proposed as catalysts, amounts of 1–10% are required to produce any effective results. The reaction products obtained by the use of hexamethylene tetramine as a catalyst are free from undesirable by-products.

The following are examples illustrating the manner of carrying the process into effect.

Example I

A mixture of 90 parts by weight of absolute ethyl alcohol, 10 parts by weight of ethylene oxide and 0.1 part by weight of hexamethylene tetramine was kept for two hours in an autoclave at 100° C., the maximum pressure being about four atmospheres. 88% of the ethylene oxide was converted mainly into ethylene glycol monoethyl ether together with very small amounts of the monoethyl ether of diethylene glycol.

Example II

A solution of ethylene oxide in absolute ethyl alcohol and containing 150 grams/litre of ethylene oxide and 0.5 gram/litre of hexamethylene tetramine was pumped continuously through a coil reactor at a pressure of about 10–12 atmospheres. The reaction coil was immersed in a boiling liquid bath at 110° C. and the products of reaction were cooled and reduced to atmospheric pressure by means of a suitable reducing valve. The rate of passage of reacting liquid was such as to ensure a contact time of about 1 hour. Analysis of the reaction product showed the presence of 37 grams/litre of unchanged ethylene oxide, indicating that 75% of the ethylene oxide in the feed had undergone reaction. The crude reaction product on distillation yielded, in addition to ethanol and unchanged ethylene oxide a mixture of ethyleneglycolmonoethylether and diethyleneglycolmonoethylether in the weight ratio of about 75 parts of the former to about 20 parts of the latter.

Example III

A solution of ethylene oxide in dry methanol and containing 150 grams/litre of ethylene oxide and 0.25 gram/litre of hexamethylene tetramine was passed through a pressure coil reactor at 110° C. under a pressure sufficient to maintain liquid-phase conditions, the time of contact being about 1.5 hours. About 98% of the ethylene oxide reacted under these conditions to yield a mixture of ethyleneglycolmonomethylether, diethyleneglycolmonomethylether and higher boiling products in the relative weight proportions of 85.7%, 8.0% and 3.2% respectively.

*Example IV*

A solution of ethylene oxide in n-butanol and containing 100 grams/litre of ethylene oxide and 0.5 gram/litre of hexamethylene tetramine was passed through a pressure coil reactor at 95° C. and a pressure sufficient to maintain liquid phase conditions (8–10 atmospheres) for a time of contact of 1.5 hours. About 70% of the ethylene oxide used was converted into n-butyl ethers, the remainder being recovered and recycled. After removing unchanged n-butanol and ethylene oxide, the residual liquid contained 67% of ethyleneglycolmono-n-butylether, 22.6% of diethyleneglycolmono-n-butylether and 10.4% of higher-boiling products.

The process is particularly suitable for obtaining glycol ethers by the interaction of alkylene oxides with aliphatic alcohols such as ethyl alcohol butyl alcohol and the like but may be applied for the production of glycol derivatives from aromatic alcohols and phenols.

What we claim is:

1. A process for the manufacture of glycol ethers which comprises interacting an alkylene oxide with an organic compound containing at leasst one hydroxyl radical, said compound being selected from the group consisting of alcohols and phenols, in the presence of a small amount of hexamethylene tetramine.

2. A process according to claim 1 wherein said alkylene oxide is ethylene oxide.

3. A process for the manufacture of monoalkyl ethers of the glycols of the group consisting of ethylene glycol and polyethylene glycol which comprises interacting ethylene oxide with an appropriate aliphatic alcohol in the presence of between about 0.01% and about 1% by weight of hexamethylene tetramine at a temperature between about 50° C. and about 200° C. under a pressure sufficient to maintain liquid phase conditions.

4. A process according to claim 1 wherein the reaction is carried out at a temperature between about 50° C. and about 200° C.

5. A process according to claim 1 wherein the reaction is carried out at a temperature between about 50° C. and about 200° C. and under a pressure sufficient to maintain liquid-phase conditions.

6. A process according to claim 1 wherein the reaction is carried out continuously by mixing a stream of the alkylene oxide with a stream of an alcohol containing a small amount of hexamethylene tetramine, heating the mixture in a reactor coil to a temperature of about 100° C., maintaining the reaction mixture at that temperature and under a pressure sufficient to maintain liquid-phase conditions for a period sufficient to ensure conversion of a major portion of the reactants, removing the reaction mixture from the reactor coil and continuously fractionating the product.

7. A process according to claim 1 wherein the amount of hexamethylene tetramine employed is between about 0.01% and about 1% by weight of the reactants.

HERBERT MUGGLETON STANLEY.
PHILIP EAGLESFIELD.